(12) United States Patent
Brandon

(10) Patent No.: US 7,146,786 B2
(45) Date of Patent: Dec. 12, 2006

(54) ELECTRIC LINEAR DECK LIFT ASSEMBLY

(76) Inventor: Dennis Brandon, 114 Woodland Hills Dr., Brentwood, TN (US) 37027

( * ) Notice: Subject to any disclaimer, the term of this patent is extended or adjusted under 35 U.S.C. 154(b) by 0 days.

(21) Appl. No.: 11/121,554

(22) Filed: May 4, 2005

(65) Prior Publication Data

US 2006/0021315 A1 Feb. 2, 2006

Related U.S. Application Data

(63) Continuation-in-part of application No. 10/900,234, filed on Jul. 27, 2004, now abandoned.

(51) Int. Cl.
*A01D 34/03* (2006.01)
*A01D 34/43* (2006.01)
*A01D 34/64* (2006.01)

(52) U.S. Cl. ...................................... 56/14.9
(58) Field of Classification Search ................ 56/14.7, 56/15.2, 14.9, 15.1, 15.3, 15.8; 280/43.21, 280/43.23
See application file for complete search history.

(56) References Cited

U.S. PATENT DOCUMENTS

| | | | | |
|---|---|---|---|---|
| 3,174,269 A | * | 3/1965 | Londo | 56/340.1 |
| 3,659,683 A | * | 5/1972 | Betzing | 188/162 |
| 3,677,574 A | * | 7/1972 | Cyr | 280/43.13 |
| 4,120,136 A | * | 10/1978 | Rose | 56/17.1 |
| 4,307,561 A | * | 12/1981 | Hicks | 56/15.9 |
| 5,689,994 A | * | 11/1997 | Nagai et al. | 74/89.32 |
| 5,862,549 A | * | 1/1999 | Morton et al. | 5/610 |
| 6,023,921 A | * | 2/2000 | Burns et al. | 56/16.3 |
| 6,250,013 B1 | * | 6/2001 | Apprich | 49/362 |
| 6,494,028 B1 | * | 12/2002 | Moore | 56/17.1 |
| 6,868,658 B1 | * | 3/2005 | Velke et al. | 56/15.8 |
| 7,003,937 B1 | | 2/2006 | Tarver | |

* cited by examiner

*Primary Examiner*—Árpád Fábián Kovács
(74) *Attorney, Agent, or Firm*—W. Edward Ramage; Baker Donelson

(57) ABSTRACT

An electric linear deck lift assembly for raising and lowering in a controlled and accurate manner the cutting deck of a lawnmower to a variety of different heights, including preset heights. An electric motor drives a linear drive rod connected to the cutting deck, thus raising and lowering the cutting deck to particular heights as determined by a positional sensor which monitors the position of the linear drive rod or an encoder which monitors the direction and number of rotations of the electric motor. Also disclosed is a combination of two or more deck lift assemblies for raising and lowering different sides of a cutting deck.

17 Claims, 5 Drawing Sheets

ELECTRIC LINEAR DECK LIFT ASSEMBLY

This application is a continuation-in-part of application Ser. No. 10/900,234, filed Jul. 27, 2004, now abandoned and claims priority thereto. The specification of application Ser. No. 10/900,234 is incorporated herein by reference.

FIELD OF INVENTION

This invention relates generally to an electric linear deck lift assembly for raising and lowering in a controlled and accurate manner the cutting deck of a lawnmower to a variety of different heights, including preset heights.

BACKGROUND OF THE INVENTION

The raising and lowering of cutting decks on lawnmowers is a highly desired function, as it permits the operator to adjust the cutting height for different depths of grass, types of areas to be mown, and obstacles over which the mower must pass. The use of mechanical devices operated by hand, such as a simple lever, to raise and lower the cutting deck is well known in the industry. Recently, motorized rotary and hydraulic devices have been attached to the cutting deck to accomplish the same result. These devices, however, typically leave electronic and mechanical parts unprotected and exposed to the elements as well as grass cuttings and similar debris. They also do not provide any preset height settings, and cannot accurately control the height of the cutting deck. In addition, the rotational control mechanism is mechanically inefficient for this particular use.

Thus, what is needed is a mechanism with an electric motor to efficiently raise and lower the cutting deck of a lawnmower in a controlled and accurate manner, including movement to preset heights.

SUMMARY OF THE INVENTION

This invention is directed to an electric linear deck lift assembly for raising and lowering the cutting deck of a lawnmower in a controlled and accurate manner to a variety of different heights, including preset heights. The present invention is particularly described in connection with application as a deck lift for a riding lawnmower, but may of course be used in any application where a similar deck or part needs to be moved in a controlled and accurate manner.

Generally, the cutting deck of a riding lawnmower is positioned underneath the chassis of the lawnmower, and is mechanically able to be raised or lowered to different heights. In the past, this has been accomplished by mechanical means operated by hand, such as a lever, or by hydraulic or motorized rotary devices operated by means of a switch. The latter devices typically raise or lower the cutting deck based on the position of the switch, but cannot raise or lower the deck in a controlled fashion or to a particular height other than the lowest and highest positions possible. Current devices also typically leave electronic and mechanical parts exposed, and are inefficient.

In one exemplary form, the present invention improves upon the above-described motorized devices by raising and lowering the cutting deck by means of a linear drive rod mechanically connected to an electric motor enclosed in a protective housing. A sensor monitors the position of the linear drive rod. This positional data is used by a positional control circuit to control the position of the linear drive rod, which directly correlates to the height of the cutting deck. Alternatively, the positional data can be obtained by means of an encoder which monitors the direction and number of rotations of the electric motor.

In another exemplary form, a series of preset heights can be established. When the sensor detects that the linear drive rod has reached a desired preset position, the positional control circuit causes the electric motor to stop.

In yet another exemplary form, the electric current to the motor is monitored by an electric current monitor or sensor. The sensor can detect a sudden substantial increase in the electric current, typically caused by running into the ground or an obstruction during lowering and raising operations. The electric current can then be cut off.

In another embodiment, two or more deck lift assemblies can be placed at different locations to control the height of different sides of the mowing deck. These assemblies can be operated together or independently as needed.

Thus, the invention in its various forms possesses several favorable characteristics relative to the mechanical and motorized rotational devices described above. The electric motor and related gears are enclosed and protected, the cutting deck is raised and lowered by an efficient linear drive mechanism, the height of the cutting deck can be determined and monitored accurately, and the cutting deck can be moved in an accurate and controlled manner to various heights, including preset heights.

Still other advantages of various embodiments will become apparent to those skilled in this art from the following description wherein there is shown and described exemplary embodiments of this invention simply for the purposes of illustration. As will be realized, the invention is capable of other different aspects and embodiments without departing from the scope of the invention. Accordingly, the advantages, drawings, and descriptions are illustrative in nature and not restrictive in nature.

DESCRIPTION OF THE EXEMPLARY EMBODIMENTS

Figure 1:
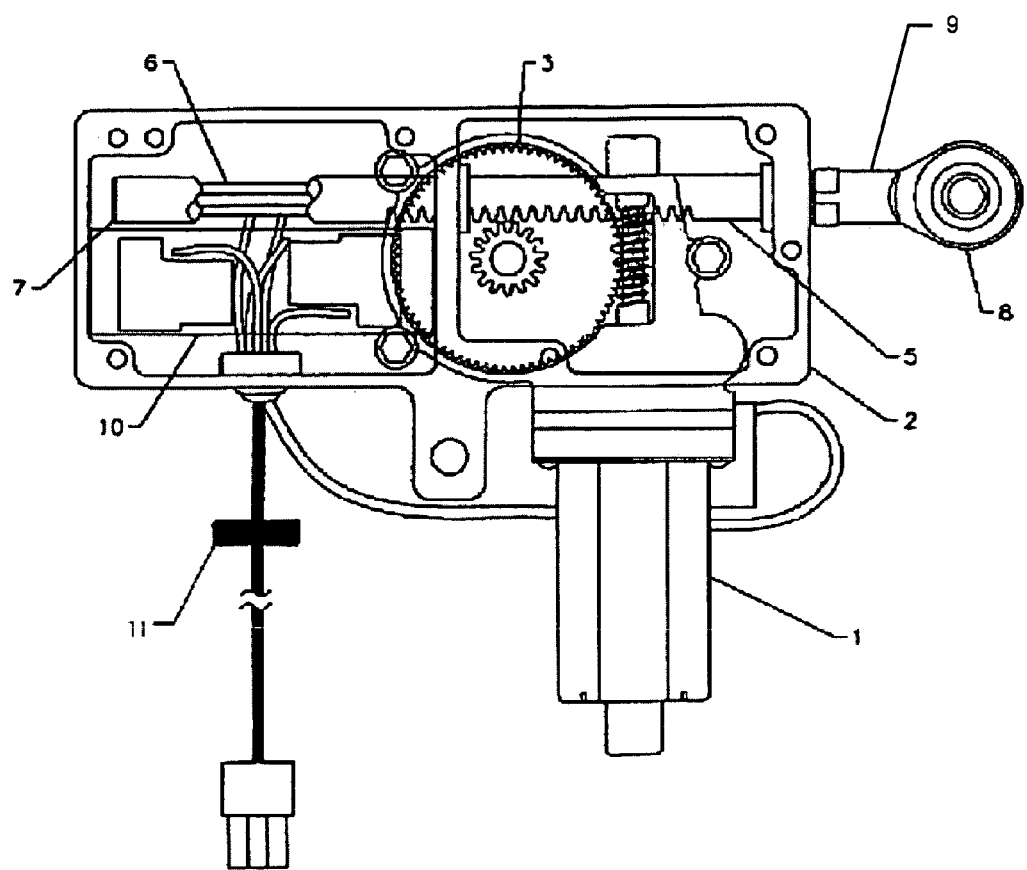
FIG. 1 is a top cut-away view of one embodiment of the present invention.
Figure 3:
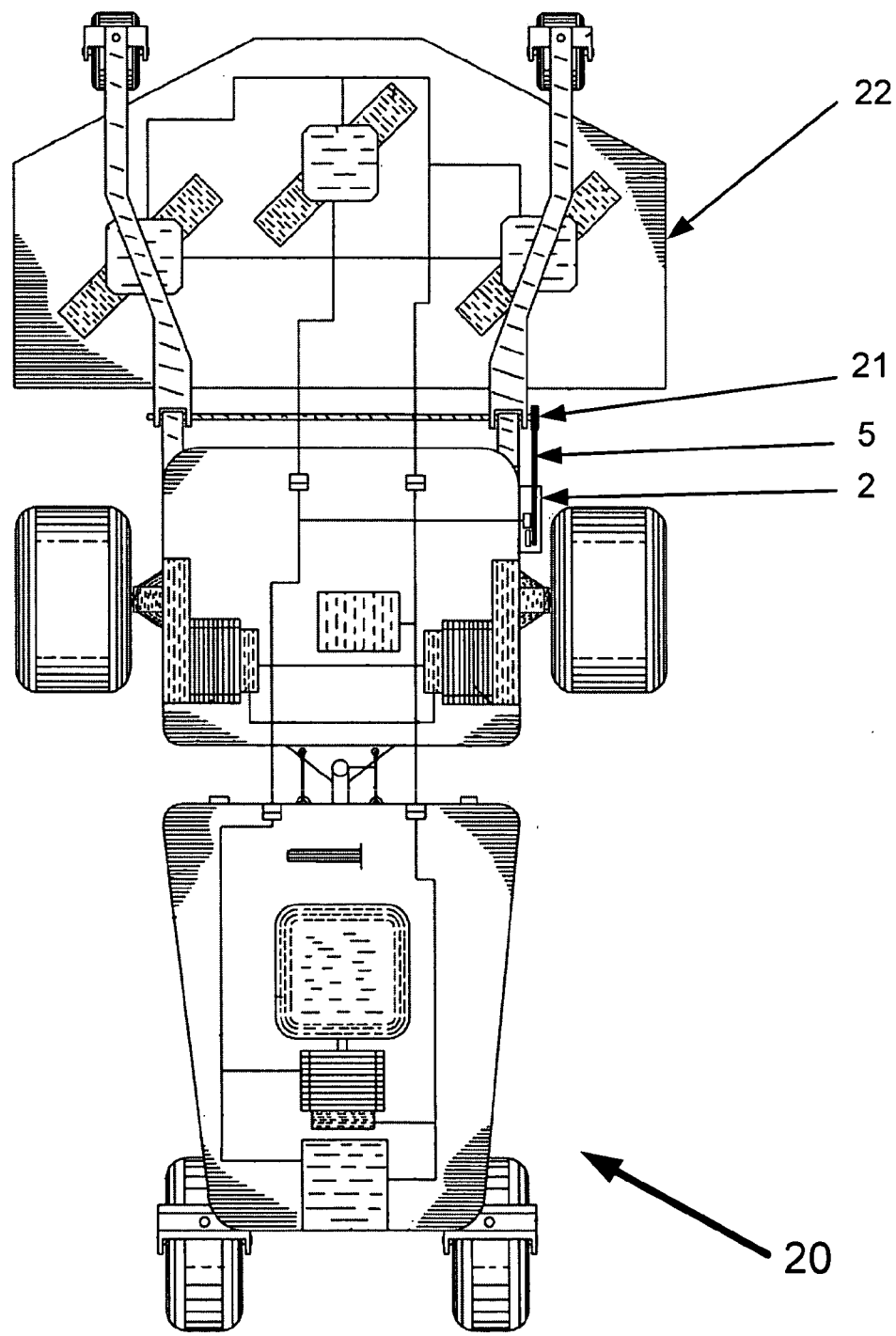
FIG. 3 is a top cut-away view of a mower with a single deck-lift assembly in accordance with one embodiment of the present invention.

One exemplary embodiment of the invention, as seen in FIG. 1, shows the general configuration of an electric motor 1 enclosed in a housing assembly 2. The electric motor 1 drives a motor gear 3 which drives a linear drive rod 5 in two directions. The linear drive rod 5 has an interior end 7 and an exterior end 9. The exterior end of the linear drive rod 5 extends out of the housing assembly 2, and as shown in FIG. 3, is mechanically connected to a lever 21 or other mechanical means for raising and lowering the cutting deck 22 on a mower 20. FIG. 3 shows an example of a mower 20 with a three-bladed cutting deck 22 attached to the rear, but the present invention works with cutting decks placed in various other configurations, such as underneath the center of the mower or to one side.

Connection means between the lever 21 and the exterior end 9 of the rod 5 can comprise a bolt or similar attachment. In one preferred embodiment, connection means comprise a rod-end bearing 8, as shown in FIG. 1. A rod-end bearing allows for a more flexible connection with greater scope of movement.

Figure 2:
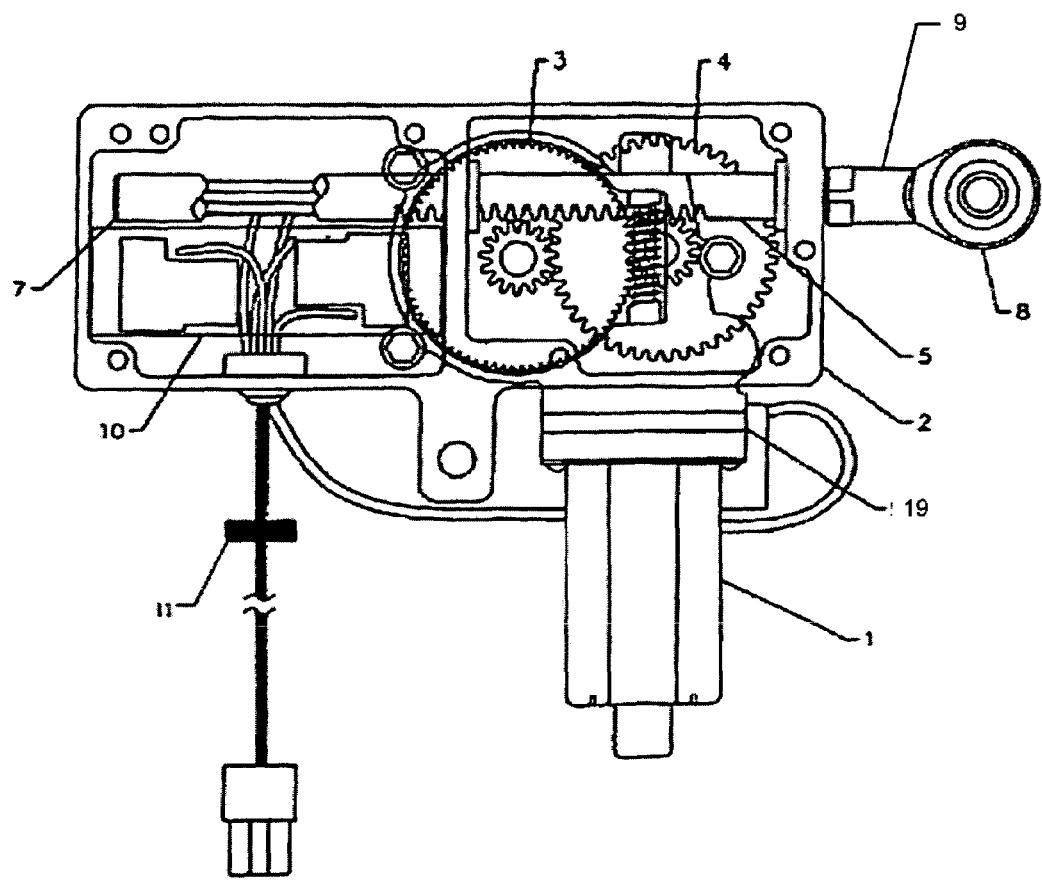
FIG. 2 is a top cut-away view of one embodiment of the invention with a reduction gear.

In another embodiment, as shown in FIG. 2, the electric motor 1 drives a motor gear 3 which in turns drives a reduction gear 4. The reduction gear 4 then drives the linear drive rod 5.

In one embodiment of the invention, as shown in FIG. 1, a positional sensor 6 is located inside the housing assembly 2, and is placed to monitor the position of the interior end 7 of the linear drive rod 5. The positional sensor 6 reports the position of the interior end 7 to means for monitoring the position of the interior end 7, such as a positional control circuit 10. The height of the cutting deck can be determined or derived from the position of the interior end 7 of the linear drive rod 5, as the rod 5 is connected to means for raising or lower the cutting deck.

Figure 4:
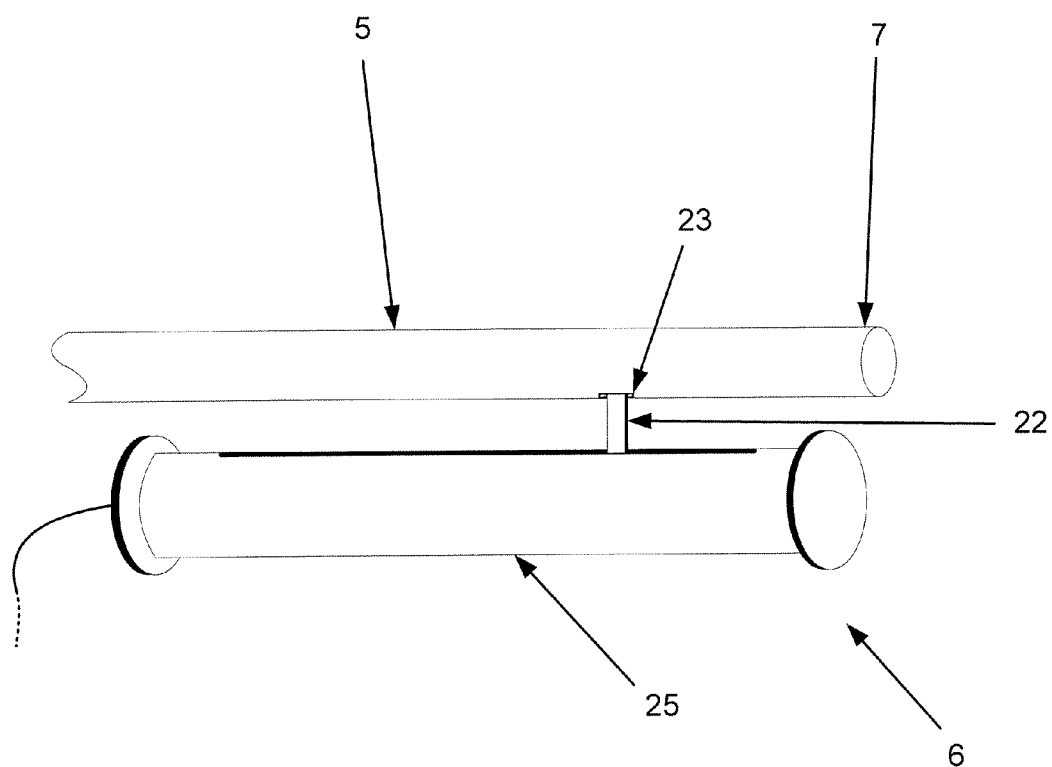
FIG. 4 shows side views of a positional sensor in accordance with one embodiment of the present invention.

In a preferred embodiment, as shown in FIG. 4, the positional sensor 6 is a linear potentiometer 25 or similar device, connected to the linear drive rod 5 so that movement of the rod 5 causes a matching movement in the moveable arm or terminal 22 of the potentiometer 25. Movement of the rod 5 thus causes the output voltage of the potentiometer 25 to vary, and the output voltage can be directly correlated to the position of the rod 5 and rod end 7. Connection means may include affixing the moveable arm or terminal 22 to the rod 5 via welding, with an adhesive, such as a glue or cement, or with mechanical means, such as a screw, bolt, or rivet. Alternatively, connection means may comprise a hole or slot 23 in the rod 5 where an end or portion of the moveable arm or terminal 22 of the potentiometer 25 may be inserted.

In an alternative exemplary embodiment, as shown in FIG. 2, the position of the linear drive rod is calculated by means of an encoder 19 affixed near to or on the shaft of the electric motor 1. The encoder 19 monitors the number and direction of rotations, which corresponds to the linear movement of the rod 5, and the position of the rod 5 and height of the cutting deck 22 are derived thereby. Encoders are well-known in the art, and include, but are not limited to, rotary, linear, contact and optical encoders. In one embodiment, for example, an optical encoder may be used to detect light passing through or reflected by a pattern, strip, code-wheel or similar device.

The invention receives input from the operator or other sources with regard to the desired height of the cutting deck. This may be in the form of direct control by the operator through an electronic control module, switch, or buttons on the mower (not shown), which causes the electric motor 1 to rotate in the appropriate direction to cause the linear drive rod 5 to move into or out of the housing assembly 2 until the desired position is reached. In alternative embodiment, a positional control circuit 10 may receive this input and cause the electric motor 1 to rotate.

In one exemplary embodiment, the mowing deck can be raised or lowered to any height between the ground and the maximum cutting height by causing the electric motor to run in one direction or the other through some input means, such as a switch, button, or electronic control module (not shown). In another exemplary embodiment, a series of preset heights can be established. When the sensor 6 or encoder 19 detects that the linear drive rod 5, and thus the mowing deck, has reached a desired preset position, the positional control circuit 10 causes the electric motor 1 to stop. Selection of a present height can be done through some input means, such as a switch, series of buttons or switches, multi-positional switch, or control module (not shown).

Figure 5:
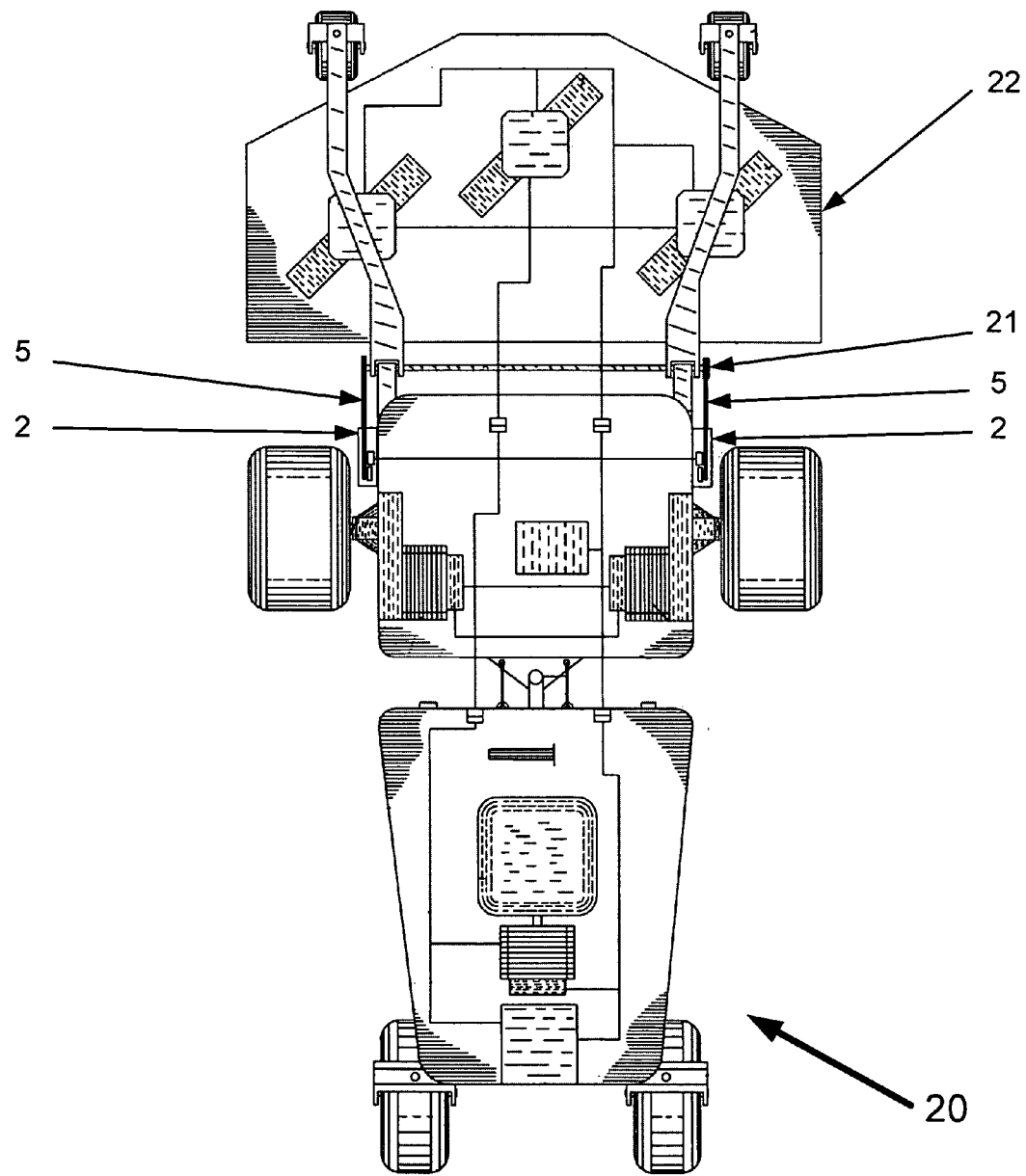
FIG. 5 is a top cut-away view of a mower with two deck-lift assemblies in accordance with one embodiment of the present invention.

In an alternative embodiment, as seen in FIG. 5, two or more deck lift assemblies as described above are mounted on the mower. Typically, in an embodiment with two deck lift assemblies, the two deck lift assemblies are mounted on the right and left sides of the mower. This arrangement permits front-to-back, with appropriate brackets, and side-to-side adjustment of the height of the mower deck, and permits operation with differing heights or leveling of the deck by adjusting the position of one deck lift assembly relative to the other deck lift assembly. The two deck lift assemblies can be operated in tandem or separately. This can be accomplished, for example, through two separate switches controlling each deck lift assembly, where the two switches can be coupled for normal operation and uncoupled for individual operation, or a single multi-positional or four-way switch.

In yet another alternative embodiment, when the mower deck (or a side of the mower deck) is being lowered, the electric current to the electric motor 1 engaged in that operation is monitored by an electric current sensor or monitor 11. Electric current sensors and monitors are well-known in the art, including such devices as magnetoresistive field sensors, ring or doughnut sensors, closed-loop and open-loop Hall-effect sensors, and the like. The electric current sensor 11 can be placed at various locations along the electric circuit as shown in the figures, or in a remote control module. When the deck or the side of the deck makes contact with the ground, the electric current increases dramatically. The electric motor 1 is stopped or shut off at the point. The positional control circuit 10, or control module, can then be set or calibrated to a ground reference point.

In an alternative embodiment involving two deck lift assemblies, as seen in FIG. 5, the above features are used for automatic deck leveling. For automatic deck leveling, both deck lift assemblies are directed to lower their respective sides of the deck to the ground, as determined by when the electric current sensor 11 detects a dramatic increase in the current to the electric motor 1. The electric motor 1 for each is shut off when the respective side contacts the ground, and the positional control circuits 10 for both sides then are calibrated to a ground reference of zero. Automatic deck leveling mode is exited, and both sides of the deck are raised in equal increments by the respective deck lift assembly.

As a similar safety feature, when the mower deck (or a side of the mower deck) is being raised, the electric current to the electric motor 1 engaged in that operation is monitored by the electric current sensor monitor 11. If the deck or the side of the deck contacts some obstruction or obstacle, the electric current increases dramatically. The electric motor 1 can then be stopped or shut off.

Thus, the invention in its various forms possesses several favorable characteristics relative to the current mechanical and motorized rotational devices known in the art. The electric motor and related gears are enclosed and protected from the elements and debris which reduces maintenance and the risk of mechanical failure while increasing the useful life of the device, the cutting deck is raised and lowered by an efficient linear drive mechanism which leads to the same benefits as above, the height of the cutting deck can be determined and monitored accurately, and the cutting deck can be moved in an accurate and controlled manner to various heights, including preset heights.

Thus, it should be understood that the embodiments and examples have been chosen and described in order to best illustrate the principals of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art. Accordingly, it is intended that the scope of the invention be defined by the claims appended hereto.

I claim:

1. An electric deck lift assembly, comprising:
 a. an electric motor;
 b. a linear drive rod mechanically connected to the electric motor, said linear drive rod comprising a first end mechanically connected to a cutting deck on a mower, and a second end; and
 c. a positional control circuit for monitoring and controlling the position of the cutting deck, said circuit electrically connected to the electric motor, wherein the positional control circuit causes the linear drive rod to move and thereby move the cutting deck to any height or to pre-determined positions between the ground and a maximum cutting height.

2. The electric deck lift assembly of claim 1, further comprising a positional sensor, electrically connected to the positional control circuit, for monitoring the position of the second end of the linear drive rod.

3. The electric deck lift assembly of claim 1, further comprising an encoder, mechanically connected to the electric motor, for monitoring and controlling the height of the cutting deck based on the direction and number of rotations of the electric motor.

4. The electric deck lift assembly of claim 1, wherein the linear drive rod is mechanically connected to the electric motor by a motor gear mechanically connected to and driven by the electric motor, and by a reduction gear mechanically connected to the motor gear and the linear drive rod.

5. The electric deck lift assembly of claim 1, further comprising a housing assembly fastened to and enclosing the electric motor, wherein the first end of the linear drive rod extends out of the housing assembly.

6. The electric deck lift assembly of claim 1, further comprising:
 a. an electric current sensor monitoring the electric current to the electric motor.

7. The electric deck lift assembly of claim 6, wherein the electric current to the electric motor is shut off when the electric current sensor detects a substantial increase in the electric current.

8. The electric deck lift assembly of claim 2, wherein the positional sensor is a linear potentiometer with a moveable arm or terminal connected to the linear drive rod.

9. The electric deck lift assembly of claim 8, wherein the linear drive rod has a slot or hole into which the moveable arm or terminal of the linear potentiometer is inserted.

10. An electric deck lift system, comprising:
 two or more electric deck lift assemblies, each electric deck lift assembly comprising an electric motor, a linear drive rod mechanically connected to the electric motor, said linear drive rod comprising a first end mechanically connected to a cutting deck on a mower, and a second end, and a positional control circuit for monitoring and controlling the position of the cutting deck, said circuit electrically connected to the electric motor, wherein the positional control circuit causes the linear drive rod to move and thereby move the cutting deck to any height or to pre-determined positions between the ground and a maximum cutting height.

11. The electric deck lift system of claim 10, further wherein each positional control circuit monitors and controls the height of the side of the cutting deck to which the respective linear drive rod is mechanically connected.

12. The electric deck lift system of claim 11, each electric deck lift assembly further comprising a positional sensor, electrically connected to the respective positional control circuit, for monitoring the position of the second end of the respective linear drive rod.

13. The electric deck lift assembly of claim 11, each electric deck lift assembly further comprising an encoder, mechanically connected to the respective electric motor, for monitoring and controlling the height of the side of the cutting deck to which the respective linear drive rod is mechanically connected based on the direction and number of rotations of the respective electric motor.

14. The electric deck lift assembly of claim 11, each electric deck lift assembly further comprising an electric current sensor monitoring the electric current to the respective electric motor.

15. The electric deck lift assembly of claim 14, wherein there are two electric deck lift assemblies adapted to automatically level the cutting deck.

16. The electric deck lift assembly of claim 12, wherein the positional sensor is a linear potentiometer with a moveable arm or terminal connected to the respective linear drive rod.

17. The electric deck lift assembly of claim 16, wherein the linear drive rod has a slot or hole into which the moveable arm or terminal of the respective linear potentiometer is inserted.

* * * * *